United States Patent
Jebai et al.

(10) Patent No.: US 12,095,393 B2
(45) Date of Patent: Sep. 17, 2024

(54) VARIABLE SPEED DRIVE AND TORQUE SENSOR

(71) Applicant: Schneider Toshiba Inverter Europe SAS, Pacy sur Eure (FR)

(72) Inventors: Al Kassem Jebai, Vernon (FR); Thomas Devos, Carrières sous Poissy (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 17/412,342

(22) Filed: Aug. 26, 2021

(65) Prior Publication Data

US 2022/0077803 A1 Mar. 10, 2022

(30) Foreign Application Priority Data

Sep. 4, 2020 (EP) .................................... 20305980

(51) Int. Cl.
*H02P 23/30* (2016.01)
(52) U.S. Cl.
CPC .......... *H02P 23/30* (2016.02); *H02P 2207/01* (2013.01)
(58) Field of Classification Search
CPC ............................ H02P 23/30; H02P 2207/01
USPC ....................................................... 318/310
See application file for complete search history.

(56) References Cited

U.S. PATENT DOCUMENTS

| | | | |
|---|---|---|---|
| 5,789,935 A | 8/1998 | Suga et al. | |
| 8,018,193 B1 | 9/2011 | Pekarek et al. | |
| 2010/0079093 A1* | 4/2010 | Kitanaka | B60L 3/04 318/400.3 |
| 2015/0246685 A1* | 9/2015 | Dixon | B62D 5/0463 701/42 |
| 2019/0193760 A1* | 6/2019 | Kumar | B61L 15/0058 |
| 2020/0274467 A1* | 8/2020 | Kim | H02P 6/10 |

OTHER PUBLICATIONS

European Search Report and Written Opinion dated Feb. 15, 2021 for corresponding European Patent Application No. EP20305980. 3-1205, 6 pages.

* cited by examiner

*Primary Examiner* — Zoheb S Imtiaz
(74) *Attorney, Agent, or Firm* — Locke Lord LLP

(57) ABSTRACT

Examples include a method for controlling a variable speed drive of an electric motor. The variable speed drive is connected to a torque sensor for sensing a torque supplied by the electric motor. The method includes performing, by the electric motor, a predetermined torque sequence. The method also includes measuring, by the torque sensor, a measured torque sequence corresponding to the predetermined torque sequence, and comparing the predetermined torque sequence and the measured torque sequence. As a result of the comparison, one or more torque sensor transfer function parameters are determined.

18 Claims, 9 Drawing Sheets

VARIABLE SPEED DRIVE AND TORQUE SENSOR

FIELD OF THE INVENTION

This invention relates to a method for controlling a variable speed drive of an electric motor, for example an electric motor of the asynchronous type, and to a variable speed drive for implementing said method.

BACKGROUND

In a conventional variable speed drive of an electric motor, in particular of an electric motor of the asynchronous type, a control law is executed by a processing unit and receives an input reference. As a function of such input reference and of measurements of values on the motor, the processing unit determines a voltage reference to be applied to the electric motor. From this voltage reference, the processing unit determines the control voltages to be applied to each output phase connected to the motor. These voltages are applied to the motor using an electronic power architecture.

In some cases, the measurements of values on the motor includes a torque measurement, such torque measurement being obtained by a torque sensor. While torque measurement of a static torque may be reliably obtained by a torque sensor, a reliable measure of a dynamic torque is difficult to obtain. In some variable speed drives of electric motors, a reliable torque measurement may be obtained after about 1s of applying a given torque. The application of a given torque permits reaching a desired acceleration, such desired acceleration corresponding to the input reference received by the processing unit of the conventional variable speed drive. A precise measurement of the value of the torque thereby contributes to precisely reaching a desired acceleration. A lack of dynamism in torque measurement leads, when controlling a motor, to limiting a reliance on torque measurement to slowly correct static errors for example.

The aim of the invention is to propose a control method for controlling a variable speed drive of an electric motor which permits increasing the precision of torque in a transitory phase, in particular to permit increasing a control gain to obtained an improved dynamic torque, while limiting reliance on torque sensor characteristics, in order to precisely and rapidly reach a desired behavior of the electric motor.

SUMMARY

The invention is defined by the appended independent claims. Additional features and advantages of the concepts herein disclosed are set forth in the description which follows.

The present disclosure describes a method for controlling a variable speed drive of an electric motor, the variable speed drive being connected to a torque sensor for sensing a torque supplied by the electric motor, the method comprising:
  performing, by the electric motor, a predetermined torque sequence;
  measuring, by the torque sensor, a measured torque sequence corresponding to the predetermined torque sequence;
  comparing the predetermined torque sequence and the measured torque sequence; and
  as a result of the comparison, determining one or more torque sensor transfer function parameters.

Such a method permits increasing the precision of torque measurement and taking into account measurement delays and sampling time, thereby increasing the precision of the variable speed drive, in particular by permitting dynamic torque measurement.

Optionally the one or more torque sensor transfer function parameters comprise one or more of a delay parameter, a gain parameter or a bandwidth parameter. Each of such parameters participates in describing the behavior of the torque sensor or electric motor, coding such behavior into the torque sensor transfer function parameters.

Optionally, the predetermined torque sequence comprises one or more torque steps. A torque step may for example provide information as to a gain parameter or as to a delay parameter. Repeating torque steps may increase precision of determination of torque sensor transfer function parameters.

Optionally, the predetermined torque sequence comprises chirp torque oscillations. Such chirp torque oscillation may for example provide information as to a bandwidth parameter.

Optionally, the predetermined torque sequence comprises one or more torque steps followed by chirp torque oscillations. Such a predetermined torque sequence configuration may for example permit determining several parameters including a delay parameter, a gain parameter and a bandwidth parameter. In some cases, the one or more torque steps are at a first torque amplitude and the chirp torque oscillations are at a second torque amplitude, the second torque amplitude being lower than the first torque amplitude. Using different amplitudes in this manner facilitates the determination of specific parameters in view of the behavior of the torque sensor or of the electric motor, for example determination of gain and delay behavior, and related parameters, using a higher amplitude, while determining frequency behavior, and related bandwidth parameter, using a lower amplitude. This also permits handling motor trajectory. The torque indeed has a direct relationship to acceleration, and thereby on speed.

Optionally, the predetermined torque sequence comprises a first torque oscillation sequence at a first frequency and a second torque oscillation sequence at a second frequency, the first frequency differing from the second frequency. Such a configuration permits determining the behavior of the torque sensor at different frequencies, leading to determining frequency related parameters.

Optionally, the method further comprises triggering, by a user of the electric motor, the performing, measuring, comparing and determining. Such triggering by a user gives a user the possibility to adjust torque sensor transfer function parameters when desired, in lieu of relying on predetermined parameters which may be less precise.

Optionally, the method further comprises repeating the performing, measuring, comparing and determining periodically. Such periodicity permits maintaining satisfactory performance of a variable speed drive over time.

Optionally, the method is applied at each start of the variable speed drive. This permits a systematic adjustment of the torque sensor transfer function parameters.

Optionally, the method further comprises recording an evolution of the one or more torque sensor transfer function parameters over time. Maintaining such a record may permit identifying issues. In some cases, the method further comprises providing a torque sensor state diagnostic based on a deviation of the one or more torque sensor transfer function parameters from a predetermined range. Identifying such a deviation may permit identifying undesired behaviors or situations.

Optionally, the method comprises taking the one or more torque sensor transfer function parameters into account for driving the electric motor. While the determination of such parameters permits evaluating characteristics of the torque sensor or of the electric motor, taking such parameters into account for driving the motor permits driving such motor more precisely and satisfactorily.

The present disclosure also describes a computer-readable storage medium comprising instructions which, when executed by a processor, cause the processor to carry out any of the methods hereby described. Such computer-readable storage medium enables the encoding of any of the methods hereby described on computing systems.

The present disclosure also describes a variable speed drive of an electric motor comprising a processor and a memory, the processor being configured to operate according to any of the methods hereby described. Such variable speed drive permits realizing the advantages of the methods described.

DETAILED DESCRIPTION

Figure 1:
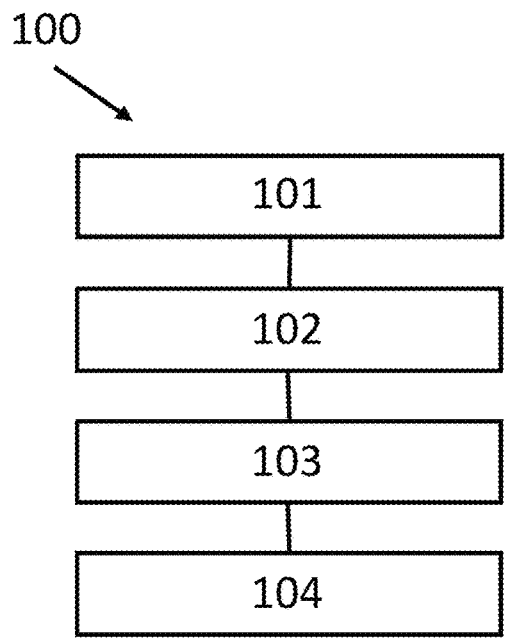
FIG. 1 illustrates an example method.

This disclosure applies to the controlling of a variable speed drive of an electric motor. A variable speed drive should be understood in this disclosure as an electronic, virtual or software implemented control unit for an electric motor. In some examples, a variable speed drive comprises a processing and control unit intended to implement a control law by taking into account, for example, an input speed set point, voltages to be applied to the electric motor during normal operation of the motor and control instructions to be applied to an inverter stage in order to obtain these output voltages. The control law may be of a vector or a scalar type. The variable speed drive may comprise a rectifier stage at an input, such rectifier stage being intended to convert an alternating voltage supplied by an electric network into a direct voltage. The variable speed drive may also comprise a direct power bus connected, on the one hand, to the rectifier stage and, on the other hand, to an inverter stage. The direct power bus can comprise two power lines connected together by at least one bus capacitor configured to stabilize the voltage of the bus. The rectifier may be of a passive type such as a diode bridge or an active type based on controlled transistors. The inverter stage may be connected at the output of the direct power bus and intended to cut off the voltage supplied by the bus at a variable voltage to the electric motor; the inverter stage comprising for example multiple switching arms each comprising controlled power transistors, for example of the IGBT type, for applying the variable voltage to the electric motor. The inverter may be controlled by, for example, a conventional technique using a PWW (Pulse Width Modulation) or DTC (Direct Torque Control) type. The control law performed by the processing unit UC makes it possible to determine the voltage to be applied to the output phases intended to be connected to the motor to be controlled.

The variable speed drive according to this disclosure is connected to a torque sensor for sensing a torque supplied by the electric motor. A torque sensor should be understood in this disclosure as a device measuring torque produced by a shaft of the electric motor. In some examples, the torque sensor is a rotary torque sensor in line with a shaft of the electric motor, between the motor and a load of the motor. Torque sensors may rely on different technologies in order to measure torque. An advantage of the methods according to this disclosure is that such methods may be used regardless of the type of technology used by the torque sensor. The torque sensor is indeed represented according to this disclosure by a torque sensor transfer function which virtually encodes the behavior of the torque sensor. A transfer function should be understood as a function having an input and an output, the input consisting for example in a torque scalar value corresponding to an output of the torque sensor, the output of the transfer function consisting for example in a torque scalar value corresponding to a torque value which will be taken into account by the variable speed drive, whereby the torque value output by the transfer function will be more precise than the torque scalar value corresponding to an output of the torque sensor. In some examples the transfer function models a torque output in function of a torque input. In some examples the transfer function is expressed as a Laplace transform. The variable speed drive and the torque sensor are connected. The connection between the torque sensor and the variable speed drive permits receiving, by the variable speed drive, data related to the torque measures by the torque sensor. Such data may be analogue or digital data. Such data may be communicated wirelessly or by a cable.

To ensure stable and efficient control, the variable speed drive preferably takes into account a number of sensor measurements, in particular a torque sensor measurement, the torque sensor measuring the torque produced by the electric motor. Lack of precision of measured torque in control operations may cause performance degradation. In particular, the torque sensor may overestimate or underestimate the torque produced by the motor, in particular in cases of a dynamic torque, a dynamic torque being for example a torque having a value changing by at least 20% over a range of time of less than 0.25 seconds, or over a range of time of less than 10 ms, or over a range of time of less than 5 ms, or over a range of time of less than 2 ms. In order to avoid such issues, the methods according to this disclosure are provided.

FIG. 1 illustrates an example method 100 according to this disclosure. As illustrated in bloc 101, method 100 comprises performing, by the electric motor, a predetermined torque sequence. A predetermined torque sequence should be understood as a specific command applied by the variable speed drive to the electric motor during a specific time period. The specific time period may be of less than 60 seconds and of more than 0.5 seconds. The specific time period may be of less than 40 seconds and of more than 5 seconds. The specific time period may be of less than 40 seconds and of more than 20 seconds. In some examples the specific time period is of less than 5 seconds and of more than 1 second. The specific command may directly result in a predetermined torque sequence, for example if the command is directly applied as a torque command which the variable speed drive applies to the electric motor. The specific command may also indirectly result in a predetermined torque sequence, for example if the command is applied using characteristics indirectly linked to the torque such as tension, intensity, or other such characteristics. The torque sequence is predetermined in that the torque sequence has a specific profile, such profile being aimed at realizing the method according to this disclosure as will be described hereby in more details.

As illustrated in bloc 102, method 100 comprises measuring, by the torque sensor, a measured torque sequence corresponding to the predetermined torque sequence. Such measuring may take place using the torque sensing technology of the torque sensor. Such measured torque sensor sequence may differ from the predetermined torque sequence for a number of reasons. Such reasons include the possibility that the effective command transmitted to the electric motor may differ from the predetermined torque sequence, for example due to characteristics of components of the variable speed drive. Such reasons also may include the possibility that the electric motor does not exactly reproduce the torque as per the effective command transmitted. Such reasons also include the possibility that the torque sensor itself may not transmit as measurement the exact torque measured. All such sources of lack of precision may be included in the measured torque sequence which will be processed according to this disclosure. Such possible combination of deviation from a theoretical predetermined torque sequence will therefore be taken into account by the methods according to this disclosure.

As illustrated in bloc 103, method 100 comprises comparing the predetermined torque sequence and the measured torque sequence. Such comparison may take place using a controller of the variable speed drive. Such comparison may also take place using a processing unit different from a controller of the variable speed drive, for example a remote processing unit. Such comparison permits identifying deviations between the predetermined torque sequence and the measured torque sequence. Such comparison may comprise producing data representing a difference between the predetermined torque sequence and the measured torque sequence.

As illustrated in bloc 104, method 100 comprises, as a result of the comparison, determining one or more torque sensor transfer function parameters. Torque sensor transfer function parameters should be understood as scalar parameters, vector parameters or matrix parameters which, when adjusted, change the output of a respective torque sensor transfer function when a specific input of the respective torque sensor transfer function is provided. Such parameters may be adjusted in order for the torque sensor transfer function to represent the behavior of the system comprising the variable speed drive, torque sensor and electric motor as far as torque measurement is concerned. Such adjustment may be obtained by considering a plurality of candidate torque sensor transfer functions, each candidate torque sensor transfer function being associated to respective candidate parameter, and by selecting a candidate torque sensor transfer function providing an output closer to the measured torque sequence when the input is the predetermined torque sequence. Parameters may also be determined based on characteristics of the comparison between the measured torque and the predetermined torque. Such determining one or more torque parameters will permit taking dynamic torque into account, in lieu of relying on static torque for driving of the electric motor.

In some examples, the one or more torque sensor transfer function parameters such as determined in bloc 104 comprise one or more of a delay parameter, a gain parameter or a bandwidth parameter. A delay parameter should be understood as a parameter related to a time delay between a torque value change as included in the predetermined torque sequence and the perception of such change in the measured torque sequence. In some examples, such a delay may be of less than 1 second. In some examples, such a delay may be of less than 0.5 second. In some examples, such a delay may be of less than 0.3 second. A gain parameter should be understood as a coefficient or factor adjusting a measured torque value to a real torque value at a given time. In some examples, if the predetermined torque sequence comprises a static torque section, such static torque section may permit determining the gain parameter by adjusting the torque sensor transfer function with the gain parameter to reflect that the measured torque should correspond to the predetermined torque when in static regime. A bandwidth parameter may reflect the ability of the overall system to behave in a specific frequency bandwidth of torque oscillations. In some examples, while the overall system comprising the variable speed drive, torque sensor and electric motor may behave in line with a predetermined torque sequence section of torque varying at a relatively lower frequency, the same overall system may not behave in line with a predetermined torque sequence section of torque varying at a relatively higher frequency. In some examples the overall system has a behavior which may be reflected by a low pass filter. In some examples, the bandwidth parameter corresponds to a cutoff frequency of a low pass filter reflecting the behavior of the variable speed drive and of the electric motor driven by the variable speed drive.

In some examples, the predetermined torque sequence performed by the electric motor as per block 101 comprises one or more torque steps. A torque step should be understood as a section of the predetermined torque sequence comprising a steep torque value change from a first specific torque value to a second specific torque value, the first torque value differing from the second torque value. The steep torque value change may be a value change from a zero torque value to a non zero torque value. The change of torque value may be, in the predetermined torque sequence, instantaneous. The change of torque value may, in the predetermined torque sequence, take place during a limited time such as for example less than 0.1 second. The change of torque value may, in the predetermined torque sequence, take place during a limited time such as for example less than 0.05 second. The change of torque value may, in the predetermined torque sequence, take place during a limited time such as for example less than 0.02 second. The change of torque value may, in the predetermined torque sequence, take place during a limited time such as for example less than 0.01 second. In some examples, the change of torque value may be of more than 10% of the second torque value. Such a torque step may be particularly suited for determination of a delay parameter, the delay parameter being related to the time taken by the measured torque to catch up with the torque change. Once having changed value, the torque may be maintained during a minimum time period to produce the step and allow for the overall system to get stabilized at that maintained torque value. In some examples, such torque value corresponding to the step is maintained for at least 0.5 second. In some examples, such torque value corresponding to the step is maintained for at least 1 second. In some examples, the torque sequence comprises a plurality of torque steps. A plurality of torque steps may comprise alternating torque change between a first torque value and a second torque value, the first and second torque values being maintained during a static torque period, the static torque period being for example of at least 0.5 seconds. In some examples the plurality of torque steps comprises more than two torque changes between different torque values, whereby the different torque values are selected from at least 3 different torque values. In some examples, the plurality of torque step comprises a first section whereby the predetermined torque value is zero, the first section lasting for about 1 second, the first section being directly followed by a second section whereby the predetermined torque value has a second value different from zero, the second section being maintained for about 1 second, the second section being directly followed by a third section whereby the predetermined torque value has a third value corresponding to the opposite of the second value, the third section being maintained for about 1 second, the third section being directly followed by a fourth section whereby the predetermined torque value has a fourth value corresponding to the second value, the fourth section being maintained for about 1 second. Using a plurality of steps may increase the precision of determination of parameters such as a delay parameter, permitting averaging parameter values for example. The sequence comprising one or more step may also be particularly suited to determining a gain parameter, due to the fact that the measured torque, once having reached the predetermined torque value after the change, should correspond to the predetermined torque value. In some examples, the torque steps comprise the torque taking and maintaining a torque value comprised between the nominal torque of the electric motor in a first direction of rotation and the nominal torque of the electric motor in the opposite direction of rotation.

In some examples, the predetermined torque sequence performed by the electric motor as per block 101 comprises chirp torque oscillations. Chirp torque oscillations should be understood as comprising a pseudo sinusoidal signal, the frequency of the pseudo sinusoidal signal varying over time. In some examples, the frequency of the chirp torque oscillations increases over time. In some examples, the chirp signal has a frequency of more than 0.2 Hz and of less 20 Hz. In some examples, the chirp signal starts at a frequency of about 1 Hz and progressively reaches a frequency of about 10 Hz. In some examples, the chirp signal has a constant amplitude. In some examples, the chirp signal has an amplitude which varies over time. In some examples, the chirp signal has a higher amplitude at lower frequency and a lower amplitude at a higher frequency. In some examples the chirp signal has a lower amplitude at lower frequency and a higher amplitude at a higher frequency, for example in order to take a mechanical inertia of the motor into account. The amplitude of the chirp signal may in some examples be comprised between 75% of the nominal torque of the electric motor in a first direction of rotation and 75% of the nominal torque of the electric motor in the opposite direction of rotation. The amplitude of the chirp signal may in some examples be comprised between 50% of the nominal torque of the electric motor in a first direction of rotation and 50% of the nominal torque of the electric motor in the opposite direction of rotation. The amplitude of the chirp signal may in some examples be comprised between the nominal torque of the electric motor in a first direction of rotation and the nominal torque of the electric motor in the opposite direction of rotation. Chirp oscillations as per this disclosure may be well suited to determining a bandwidth parameter related to a cut off frequency. The behavior of the electric motor indeed follows more closely a torque predetermined sequence at a lower frequency compared to a torque predetermined sequence at a higher frequency, for example due to mechanical inertia. The chirp signal thereby permits determining a torque frequency or torque frequency range at which the electric motor exhibits difficulties at following the predetermined torque sequence.

In some examples, the predetermined torque sequence performed by the electric motor as per bloc 101 comprises one or more torque steps followed by chirp torque oscillations. An inverted sequence may also be considered. Such a configuration permits for example determining a gain parameter and a delay parameter using the one or more torque steps and determining a bandwidth parameter using the chirp signal. In some examples, such torque steps comprise torque steps alternating between a nominal torque of the engine in a first direction of rotation and the nominal torque of the engine in an opposite direction of rotation, thereby producing a torque change corresponding to twice the amplitude of the nominal torque, such significant change permitting determining a delay parameter with particularly significant precision. In some examples, the chirp signal has a constant amplitude corresponding to about 25% of a nominal torque of the electric motor. Using a relatively lower value for the amplitude of the chirp signal compared to the torque value used for the step permits lowering the impact of mechanical inertia when the electric motor follows the chirp signal. In some examples the one or more torque steps comprise a first step at torque zero for about a second, a second step at nominal torque for about a second directly following the first step, a third step at the opposite of the nominal torque for about a second directly following the second step, a fourth step at the nominal torque for about a second directly following the third step, a chirp signal being applied directly following the fourth step, the chirp signal having an amplitude of about 25% of the nominal torque, the chirp signal starting at about 1 Hz and continuously progressing to a frequency of about 10 Hz, the continuous progression taking place during about 25 seconds, the overall predetermined torque sequence lasting about 30 seconds in total. Indeed, in some examples, the one or more torque steps are at a first torque amplitude and the chirp torque oscillations are at a second torque amplitude, the second torque amplitude being lower than the first torque amplitude. In some examples, the second torque amplitude is lower than a quarter of the first torque amplitude. In some examples, the second torque amplitude is lower than half the first torque amplitude. In some examples, the second torque amplitude is lower than three quarters of the first torque amplitude. In some examples, the chirp signal has an amplitude of about 25% of the nominal torque, the chirp signal starting at about 1 Hz and progressing to a frequency of about 10 Hz by following different frequency levels, the frequency remaining stable at a given level, the progression taking place during about 25 seconds, the overall predetermined torque sequence lasting about 30 seconds in total, each level lasting for example about 2.5 second, each level being followed by another level at a frequency of about 1 Hz higher than the previous level. Indeed, in some examples the predetermined torque sequence comprises a first torque oscillation sequence at a first frequency and a second torque oscillation sequence at a second frequency, the first frequency differing from the second frequency.

Figure 2:
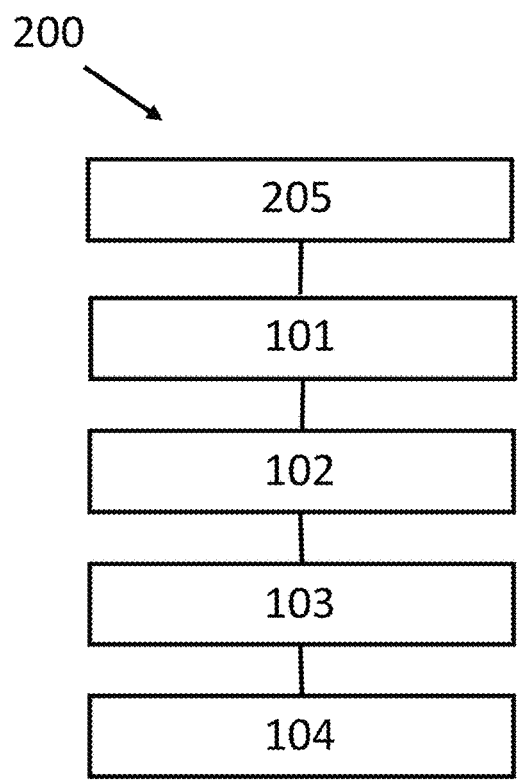
FIG. 2 illustrates another example method.

An example method 200 according to this disclosure is illustrated in FIG. 2. Method 200 comprises blocs 101-104 in line with blocs 101-104 as described in FIG. 1. Method 200 further comprises bloc 205 of triggering, by a user of the electric motor, the performing, measuring, comparing and determining. Such triggering may take place in response to a user action. An example user action is the actuation of a mechanical button. An example user action is the actuation of a graphical button on a graphical variable speed drive interface. A user may proceed with such triggering in response to observing issues with the electric motor or with the variable speed drive. Such triggering by a user may prevent proceeding with the method according to this description at a moment which would not be convenient to a user.

Figure 3:
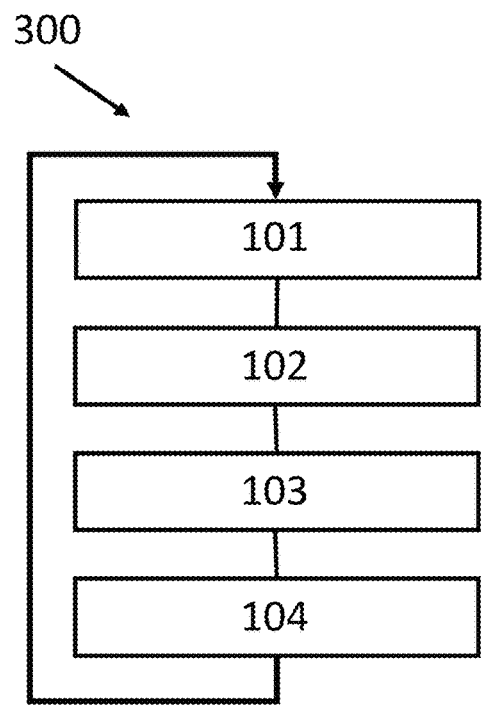
FIG. 3 illustrates a further example method.
Figure 4:
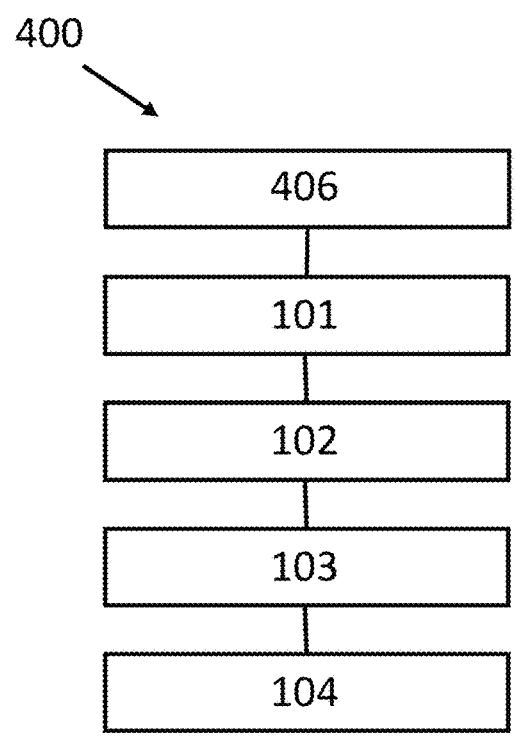
FIG. 4 illustrates yet another example method.

An example method 300 according to this disclosure is illustrated in FIG. 3. Method 300 comprises blocs 101-104 in line with blocs 101-104 as described in FIG. 1. Method 300 further comprises repeating the performing, measuring, comparing and determining periodically. Such period may be for example set by a user. Example period may be one of once a day, once a month or once a year. Such period may be set following a time of use of the electric motor. Such period may be set following a specific schedule adapted to a specific motor type or adapted to the torque sensor, for example by shortening the period as an electric motor ages. Such period may be set remotely, for example by an electric motor or variable speed drive manufacturer or torque sensor manufacturer An example method 400 according to this disclosure is illustrated in FIG. 4. Method 400 comprises blocs 101-104 in line with blocs 101-104 as described in FIG. 1. Method 400 further comprises bloc 406 of starting the electric motor, such start being followed by applying, at each start of the variable speed drive, the performing, measuring, comparing and determining. This may permit ensuring that the electric motor is driven using updated parameters according to this disclosure.

Figure 5:
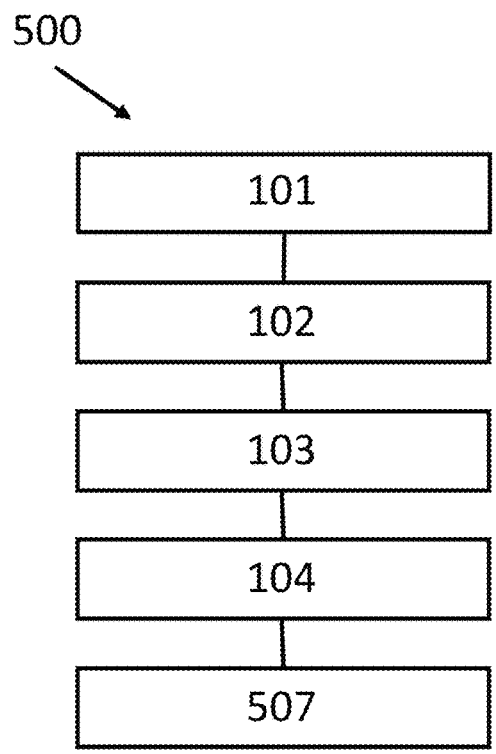
FIG. 5 illustrates yet a further example method.

An example method 500 according to this disclosure is illustrated in FIG. 5. Method 500 comprises blocs 101-104 in line with blocs 101-104 as described in FIG. 1. Method 500 further comprises bloc 507 of recording an evolution of the one or more torque sensor transfer function parameters over time. Such evolution record may be for example stored in a memory of the variable speed drive according to this disclosure. Such evolution record may also, or alternatively, be stored remotely. Such evolution record may be stored on a centralized data depository, such centralized data depository storing evolution records corresponding to a plurality of variable speed drives, thereby permitting comparing an evolution of such variable speed drives and corresponding electric motors. Such centralized data depository may be maintained by a manufacturer of the electric motor or of the variable speed drive in order to monitor the plurality of variable speed drives and electric motors, thereby permitting implementing preventive measures if a certain evolution is detected for a certain type of variable speed drive, electric motor or torque sensor.

Figure 6:
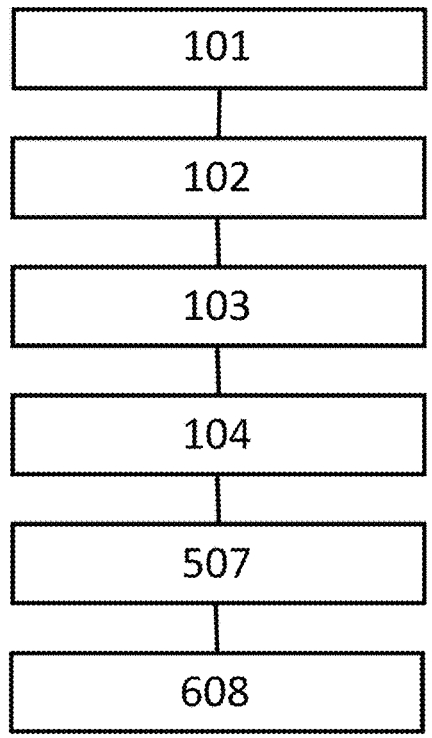
FIG. 6 illustrates an additional example method.

An example method 600 according to this disclosure is illustrated in FIG. 6. Method 600 comprises blocs 101-104 in line with blocs 101-104 as described in FIG. 1. Method 600 comprises bloc 507 in line with bloc 507 as describe in FIG. 5. Method 600 further comprises bloc 608 of providing a torque sensor state diagnostic based on a deviation of the one or more torque sensor transfer function parameters from a predetermined range. Such providing of diagnostic may permit preventing or solving issues which otherwise would negatively impact the operation of the electric motor and/or of the variable speed drive. Life expectancy of an electric motor, variable speed drive or torque sensor may indeed be rendered longer by applying a method according to this disclosure.

Figure 7:
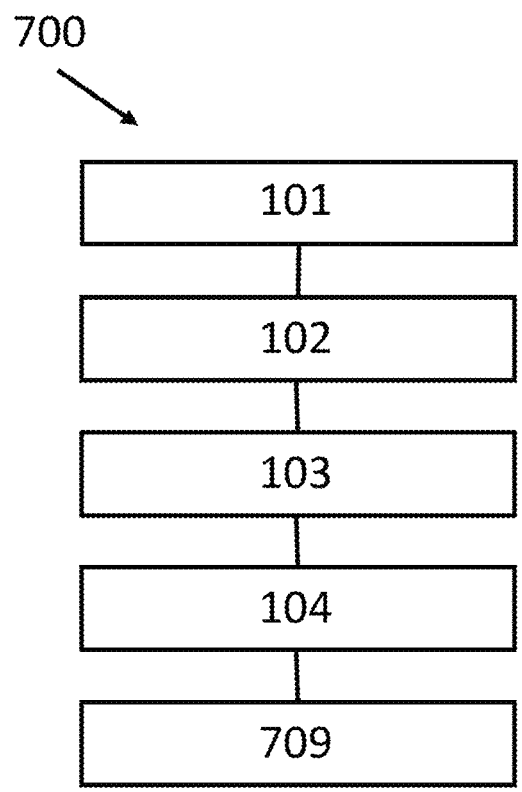
FIG. 7 illustrates yet an additional example method.

An example method 700 according to this disclosure is illustrated in FIG. 7. Method 700 comprises blocs 101-104 in line with blocs 101-104 as described in FIG. 1. Method 700 further comprises in bloc 709 driving the electric motor by taking the one or more torque sensor transfer function parameters into account. This permits to use the method according to this disclosure not only for diagnostic purposes, but also for improving the precision of operation of the respective electric motor, whereby a control feedback loop taking the measured torque into account may do so with a greater precision by implementing the torque sensor transfer function comprising the one or more determined torque sensor transfer function parameters.

Figure 8:
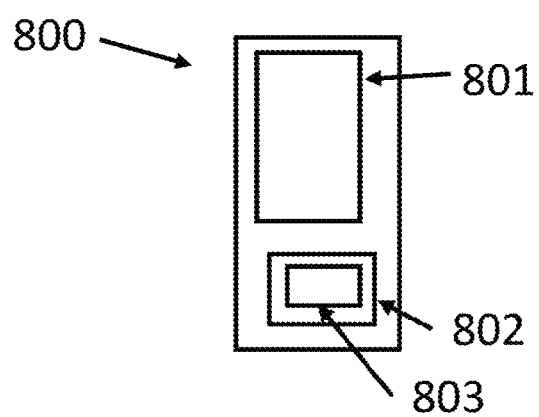
FIG. 8 illustrates an example variable speed drive.

FIG. 8 illustrates an example variable speed drive 800 comprising a processor 801, a memory 802, the processor 801 being configured to operate according to any of the methods hereby described. Processor 801 may comprise electronic circuits for computation managed by an operating system.

FIG. 8 also illustrates a non-transitory machine-readable or computer readable storage medium, such as, for example, memory or storage unit 802, whereby the non-transitory machine-readable storage medium is encoded with instructions 803 executable by a processor such as processor 801, the machine-readable storage medium comprising instructions 803 to operate processor 801 to perform as per any of the example methods hereby described.

A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described.

Storage or memory may include any electronic, magnetic, optical or other physical storage device that stores executable instructions as described hereby.

Figure 9:
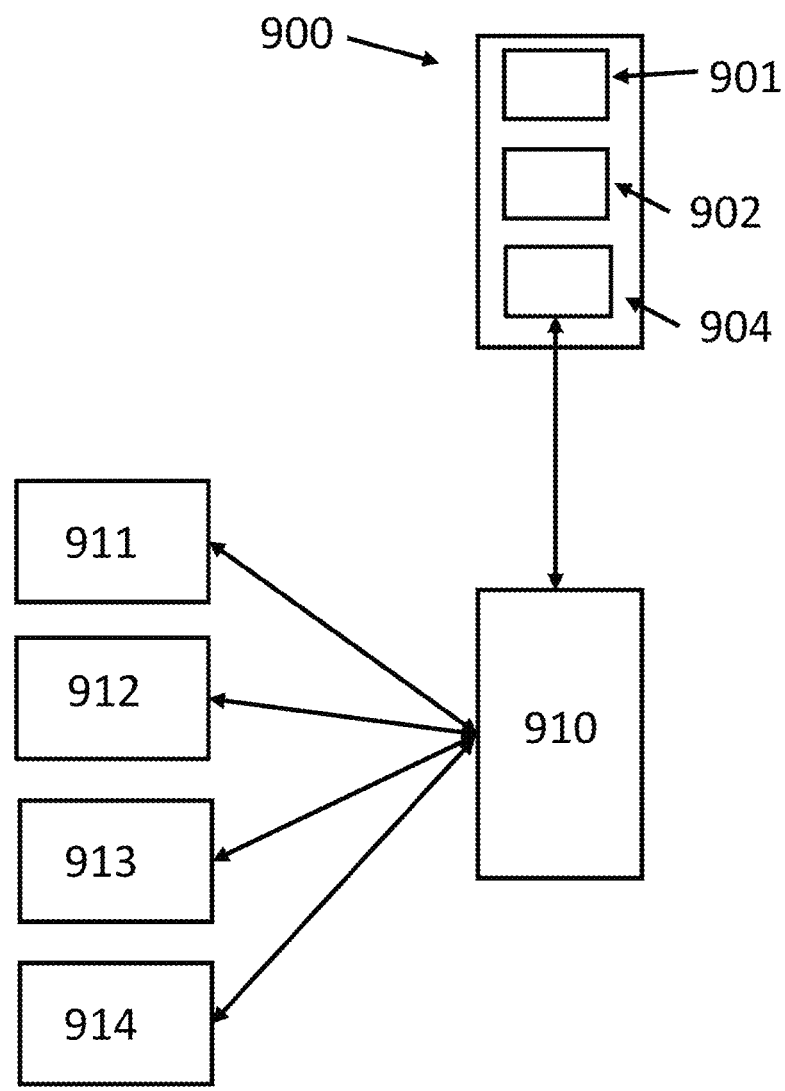
FIG. 9 illustrates another example variable speed drive.

FIG. 9 illustrates an example variable speed drive 900 comprising a processor 901, a memory 902, the processor 901 being configured to operate according to any of the methods hereby described. Processor 901 may comprise electronic circuits for computation managed by an operating system. Variable speed drive 900 further comprises a networking module 904. Networking module 904 permits transmitting data related to torque sensor transfer function parameters according to this disclosure to a centralized data depository 910. Centralized depository 910 may in turn be connected to a plurality of variable speed drives 911-914 according to this disclosure. Such centralized depository may collect torque sensor transfer function parameters according to this disclosure in a memory of the centralized depository, the centralized depository processing such collected transfer function parameters using a processing unit or processor of the centralized depository in order to monitor the plurality of variable speed drive connected or networked to the centralized depository.

Figure 10A:
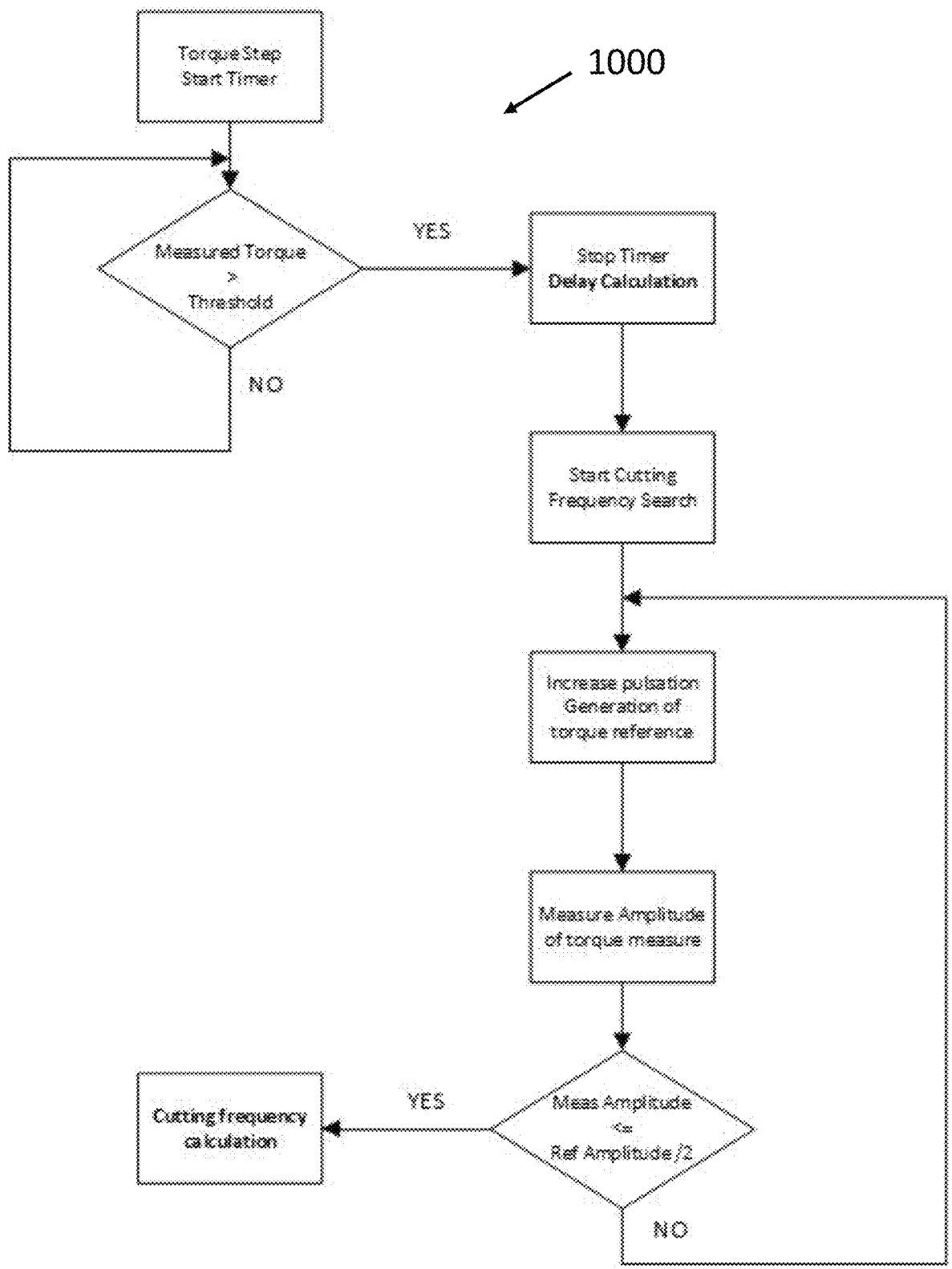
FIG. 10A-D illustrates a further additional example method.
Figure 10B:
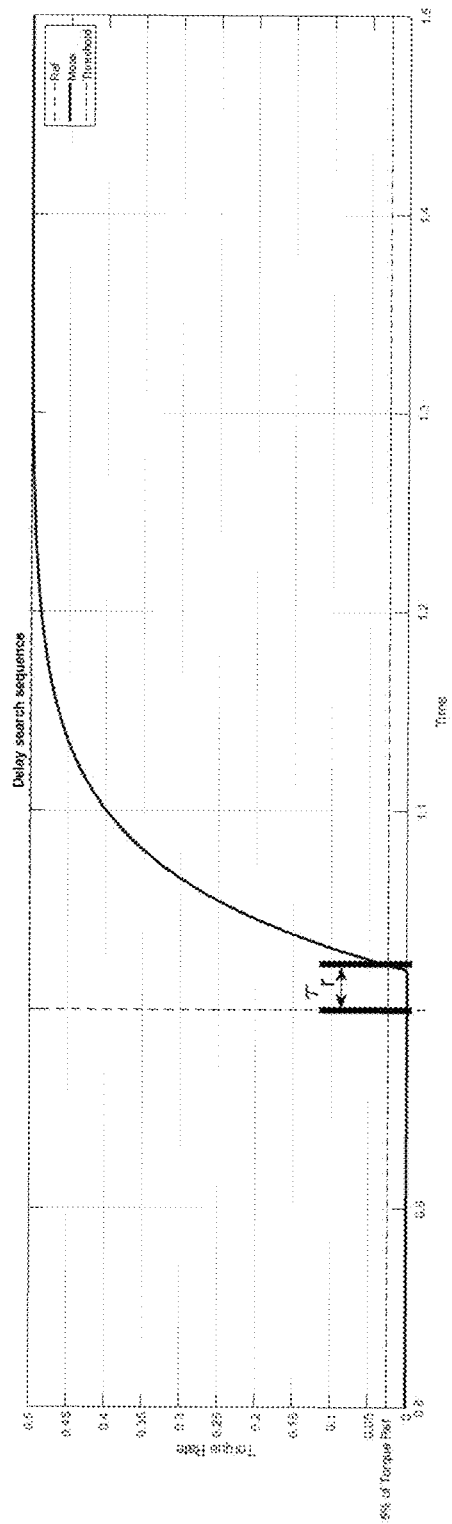
Figure 10C:
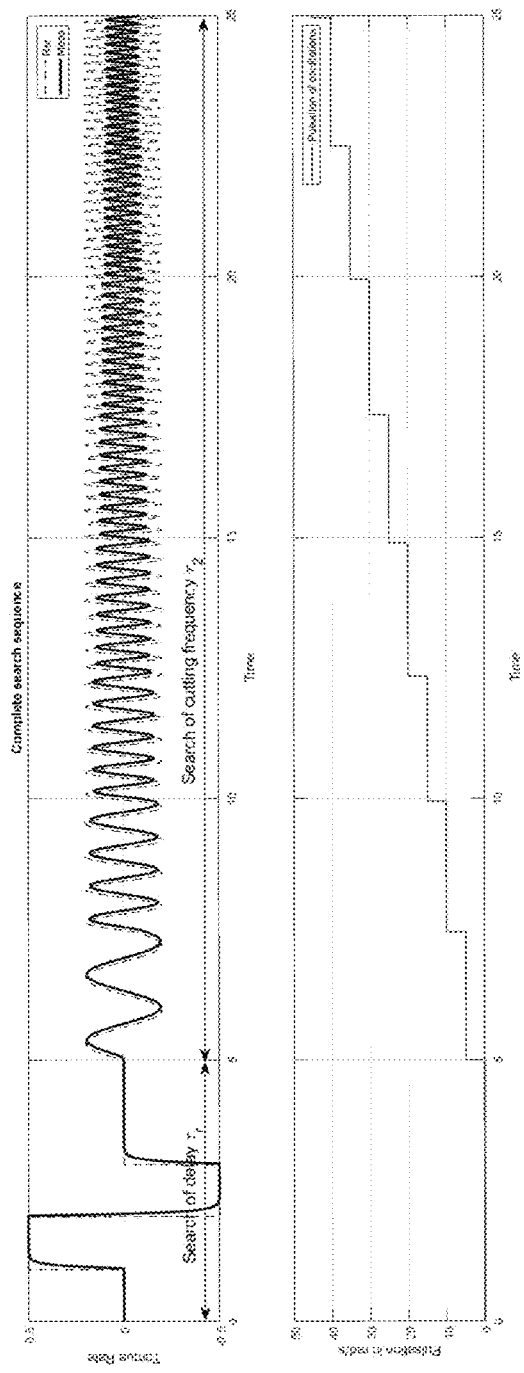
Figure 10D:
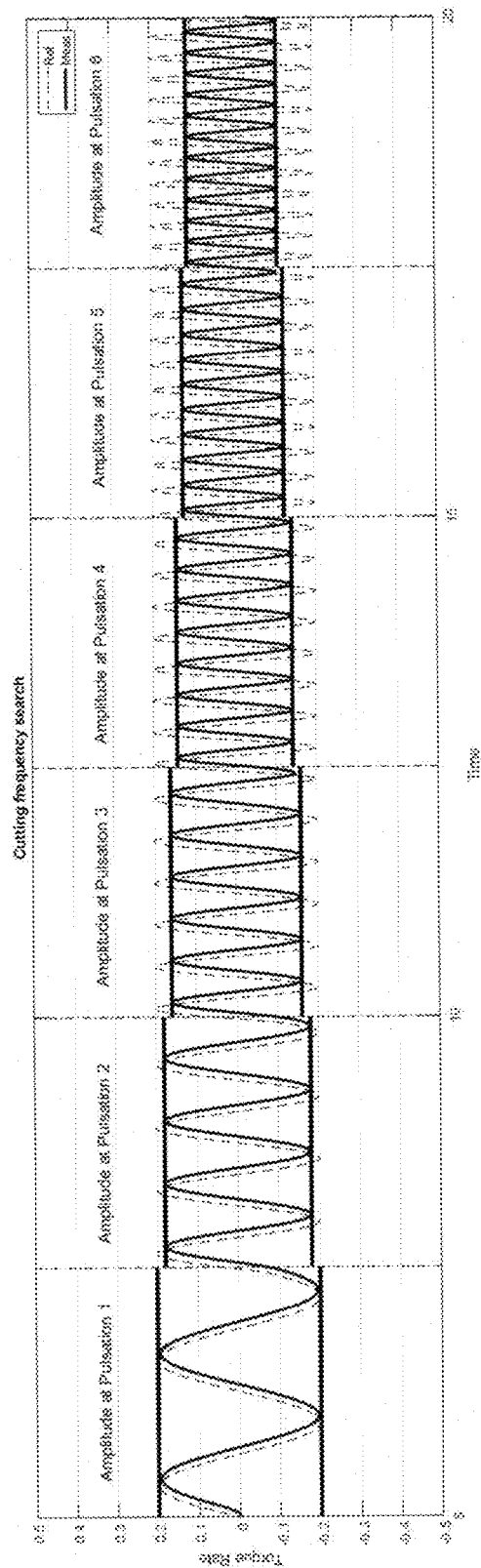

FIG. 10A illustrates a specific example method 1000 according to this disclosure. In a first step, the method comprises starting a timer for generation of torque steps as part of the predetermined torque sequence for performing by the electrical motor. The measured torque is compared to a measured torque threshold which may for example correspond to 5% of the amplitude of the torque step of the predetermined torque sequence as illustrated for example in FIG. 10B where the torque sequence is represented as a dashed line and the measured torque as a solid line. Detecting that the measured torque passes the torque threshold corresponds to detecting that the electric motor started to respond to the predetermined torque sequence. The delay $\tau_r$ as illustrated in FIG. 10B between the moment at which the torque step was applied, and the moment at which the measured torque reached the threshold corresponds to a delay parameter. In this example, the delay parameter is determined when the measured torque reaches a 5% threshold, but other threshold values may be considered. In some examples, the delay is determined when the measured torque reaches X % of a torque value applied by the variable speed drive as part of the torque sequence. In some examples, X is a number comprised between 1 and 99. In some examples, X is a number comprised between 2 and 50. In some examples, X is a number comprised between 3 and 30. In some examples, X is a number comprised between 3.5 and 20. In some examples, X is a number comprised between 4 and 10. In the example of FIG. 10B, $\tau_r$ takes a value of about 0.02 second. As illustrated in FIG. 10A, the determination of the delay parameter is followed by the variable speed drive starting cutting a frequency search, in other words applying to the electric motor part of the predetermined torque sequence comprising torque oscillations as illustrated for example in FIG. 10C or 10D, such oscillation starting in the case of FIG. 10C after 5 seconds, the first 5 seconds serving for the determination of the delay parameter. As illustrated in FIGS. 10A and 10C the pulsation rate generated (illustrated in FIG. 10C in radians per second), or frequency, is progressively increased. In FIG. 10C, the dashed line represents the measured torque, the solid line representing the predetermined sequence as applied by the variable speed drive to the electric motor. As may be observed in FIG. 10C, the measured torque amplitude lags as the frequency becomes higher. This permits determining a cutoff frequency parameter according to this disclosure. In the example illustrated in FIG. 10A, the cutoff frequency parameter corresponds to the frequency at which the amplitude of the measured signal represents half or 50% of the amplitude of the corresponding predetermined sequence signal. In other cases, a different percentage or value may be used to determine the cutoff frequency. In some examples, the cutoff frequency parameter is determined as the frequency at which the measured torque amplitude represents Y % of a corresponding predetermined sequence torque amplitude. In some examples, Y is a number comprised between 90 and 10. In some examples, Y is a number comprised between 80 and 20. In some examples, Y is a number comprised between 70 and 30. In some examples, Y is a number comprised between 60 and 40. In the case of FIG. 10C, the predetermined torque sequence comprises a torque oscillation frequencies increased step by step, in this case by steps of 5 rad/s, each step lasting about 5s. Other step values may be considered in other examples. FIG. 10D represents specifically the part of the predetermined sequence of FIG. 10C which comprises the torque oscillations leading to determining the cutoff frequency. In the case of FIG. 10D, the measured torque is in solid line and the predetermined sequence in dashed line. Solid line segments represent the torque amplitude value as measured at given frequencies. As illustrated in FIG. 10D, the measured torque amplitude progressively lowers compared to the amplitude as per the predetermined sequence as the frequency increases.

Example torque sensor transfer functions include $$H(s) = \frac{1}{1 + \tau_2 s} e^{-\tau_r s}$$

Where H is the transfer function in the Laplace space, s being in s$^{-1}$, whereby $\tau_r$ is determined as delay parameter and $\tau_2$ as bandwidth parameter, or cutoff frequency parameter.

The invention claimed is:

1. A method for controlling a variable speed drive of an electric motor, the variable speed drive being connected to a torque sensor for sensing a torque supplied by the electric motor, the method comprising:
   performing, by the electric motor, a predetermined torque sequence, wherein the predetermined torque sequence has a theoretical predetermined torque sequence with a specific profile and comprises chirp torque oscillations, and wherein the chirp torque oscillations comprise a pseudo sinusoidal signal whose frequency varies over time;
   measuring, by the torque sensor, a measured torque sequence corresponding to the predetermined torque sequence performed by the electric motor;
   comparing the theoretical predetermined torque sequence and the measured torque sequence; and
   as a result of the comparison, determining one or more torque sensor transfer function parameters for a torque sensor transfer function which is configured to output measurement of torque supplied by the electric motor for use by the variable speed drive based on the measured torque from the torque sensor and the one or more torque sensor transfer function parameters.

2. The method according to claim 1, wherein the one or more torque sensor transfer function parameters comprise one or more of a delay parameter, a gain parameter or a bandwidth parameter.

3. The method according to claim 1, wherein the predetermined torque sequence comprises one or more torque steps.

4. The method according to claim 1, wherein the predetermined torque sequence comprises one or more torque steps followed by the chirp torque oscillations.

5. The method according to claim 4, wherein the one or more torque steps are at a first torque amplitude and the chirp torque oscillations are at a second torque amplitude, the second torque amplitude being lower than the first torque amplitude.

6. The method according to claim 1, wherein the predetermined torque sequence comprises a first torque oscillation sequence at a first frequency and a second torque oscillation sequence at a second frequency, the first frequency differing from the second frequency.

7. The method according to claim 1, the method further comprising triggering, by a user of the electric motor, the performing, measuring, comparing and determining.

8. The method according to claim 1, the method further comprising repeating the performing, measuring, comparing and determining periodically.

9. The method according to claim 1, the method being applied at each start of the variable speed drive.

10. The method according to claim 1, the method further comprising recording an evolution of the one or more torque sensor transfer function parameters over time.

11. The method according to claim 10, the method further comprising providing a torque sensor state diagnostic based on a deviation of the one or more torque sensor transfer function parameters from a predetermined range.

12. The method according to claim 1, the method comprising taking the one or more torque sensor transfer function parameters into account for driving the electric motor.

13. A non-transitory computer-readable storage medium comprising instructions which, when executed by a processor, cause the processor to carry out the method of claim 1.

14. A variable speed drive of an electric motor comprising a processor and a memory, the processor being configured to operate according to claim 1.

15. The method according to claim 1, wherein the frequency of the pseudo sinusoidal signal increases over time.

16. The method according to claim 1, wherein the performs, by the electric motor performs the predetermined torque sequence as commanded by the variable speed drive.

17. The method according to claim 1, wherein the one or more torque sensor transfer function parameters comprise one or more of a delay parameter or a bandwidth parameter.

18. The method according to claim 1, wherein the torque sensor transfer function is expressed as a Laplace transform.

* * * * *